United States Patent

Su

(10) Patent No.: US 9,733,947 B2
(45) Date of Patent: Aug. 15, 2017

(54) METHOD OF PROACTIVELY EVENT TRIGGERING AND RELATED COMPUTER SYSTEM

(71) Applicant: Wistron Corporation, New Taipei (TW)

(72) Inventor: Chien-Feng Su, New Taipei (TW)

(73) Assignee: Wistron Corporation, New Taipei (TW)

( * ) Notice: Subject to any disclaimer, the term of this patent is extended or adjusted under 35 U.S.C. 154(b) by 345 days.

(21) Appl. No.: 13/902,943

(22) Filed: May 27, 2013

(65) Prior Publication Data

US 2014/0040606 A1 Feb. 6, 2014

(30) Foreign Application Priority Data

Jul. 31, 2012 (TW) .............................. 101127590 A

(51) Int. Cl.
*G06F 9/44* (2006.01)
*G06F 1/32* (2006.01)

(52) U.S. Cl.
CPC .............. *G06F 9/44* (2013.01); *G06F 1/3203* (2013.01); *G06F 9/4401* (2013.01)

(58) Field of Classification Search
CPC ....... G06F 9/4411; G06F 13/22; G06F 13/385
See application file for complete search history.

(56) References Cited

U.S. PATENT DOCUMENTS

| | | | | |
|---|---|---|---|---|
| 9,128,730 B2* | 9/2015 | Yu | .......................... | G06F 9/4406 |
| 2004/0039835 A1* | 2/2004 | Glenn | ................. | G06F 13/4282 709/231 |
| 2005/0062715 A1* | 3/2005 | Tsuji | ....................... | G06F 1/162 345/158 |
| 2005/0198421 A1* | 9/2005 | Nalawadi | .............. | G06F 9/4812 710/260 |
| 2006/0026323 A1* | 2/2006 | Ando | ............................ | 710/260 |
| 2007/0011471 A1* | 1/2007 | Yu | .......................... | G06F 1/3228 713/300 |
| 2007/0079031 A1* | 4/2007 | Kung | .................... | G06F 13/385 710/62 |

(Continued)

FOREIGN PATENT DOCUMENTS

| | | |
|---|---|---|
| CN | 101404113 A | 4/2009 |
| TW | 201117103 | 5/2011 |

OTHER PUBLICATIONS

Advanced Configuration and Power Interface Specification, Dec. 6, 2011, Section 12.*

(Continued)

*Primary Examiner* — Thomas Lee
*Assistant Examiner* — Gary Collins
(74) *Attorney, Agent, or Firm* — Winston Hsu

(57) ABSTRACT

A method of proactively event triggering in a computer system is disclosed. The computer system includes an application unit and an interface. The method includes the application unit sending a setting signal to change a voltage level of a pin of a control chip module; the pin generating a triggering event to the interface unit when the voltage level of the pin changes; and the interface accessing a controller according to the triggering event to allow the application unit to communicate with the controller proactively.

14 Claims, 2 Drawing Sheets

(56) References Cited

U.S. PATENT DOCUMENTS

| | | | |
|---|---|---|---|
| 2008/0028202 A1* | 1/2008 | Falkenburg | G06F 9/545 713/100 |
| 2008/0147913 A1* | 6/2008 | Miguel | G06F 13/32 710/48 |
| 2010/0325403 A1* | 12/2010 | Xu | G06F 11/3664 713/2 |
| 2012/0191990 A1* | 7/2012 | Hodge et al. | 713/300 |

OTHER PUBLICATIONS

Office action dated Dec. 15, 2014 for the Taiwan application No. 101127590, filing date: Jul. 31, 2012, p. 1 line 1-14, p. 2-5 and p. 6 line 1-20.

* cited by examiner

METHOD OF PROACTIVELY EVENT TRIGGERING AND RELATED COMPUTER SYSTEM

BACKGROUND OF THE INVENTION

1. Field of the Invention

The present invention relates to a method of event triggering in a computer system and the related computer system, and more particularly, to a method of proactively event triggering in a computer system and the related computer system.

2. Description of the Prior Art

The system control interrupt (SCI) provides system management and customized functions for operating systems supporting advanced configuration and power interface (ACPI). The hardware (e.g. an embedded controller) notifies the basic input output system (BIOS) that an interrupt event occurs by utilizing the SCI. After the SCI signal is generated, the BIOS may process the related events. For example, a keyboard controller (KBC) can communicate with an application by utilizing the SCI. The application then utilizes the management techniques of the windows management instrumentation (WMI) to give the KBC corresponding commands through programming and script language such as ACPI source language (ASL). In other words, the application passively communicates with the BIOS after being notified.

The system management interrupt (SMI) is generated when an equipment or software is calling system management functions. The SMI forces the central processing unit (CPU) to enter a system management mode (SMM). An application can interrupt the BIOS directly by utilizing the SMI, where the BIOS performs corresponding commands to a KBC. For example, the triggering of the SCI may force a CPU to enter the SMM, and the BIOS may acknowledge which program needs to be executed after the CPU enters the SMM. When all of the processes are completely performed, a command "RSM" may indicate the CPU to leave the SMM or the CPU may leave by resetting.

However, sometimes the chipset controlling module of a computer system may not support the interrupting function of the SCI/SMI. For example, Intel® may remove the SCI/SMI function of the new generation Clover Trail chipset for the operating system Microsoft Windows 8 . However, there are still many applications required to utilize SCI/SMI for performing commands or filling values on the KBC presently. As a result, functions of many applications under the conventional platforms will be affected or will not work. Besides, for the SCI, the application plays a passive role, which waits until the hardware gives them notifications and then performs the corresponding actions. The application can not trigger the communication with the hardware proactively. On the other hand, the SMI may force the CPU to enter the SMM, which causes the user to feel lagging when operating the system.

SUMMARY OF THE INVENTION

It is therefore an objective of the present invention to provide a method of proactively event triggering in a computer system in order to improve system performance.

The present invention discloses a method of proactively event triggering in a computer system. The computer system comprises an application unit and an interface. The method comprises the application unit sending a setting signal to change a voltage level of a pin of a control chip module; the pin generating a triggering event to the interface unit when the voltage level of the pin changes; and the interface accessing a controller according to the triggering event to allow the application unit to communicate with the controller proactively.

The present invention further discloses a computer system, which comprises a controller; a pin for generating a triggering event, wherein the pin is an input pin or an output pin of a control chip module; an application unit for sending a setting signal to change a voltage level of the pin; and an interface unit for accessing the controller according to the triggering event to allow the application unit to communicate with the controller proactively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
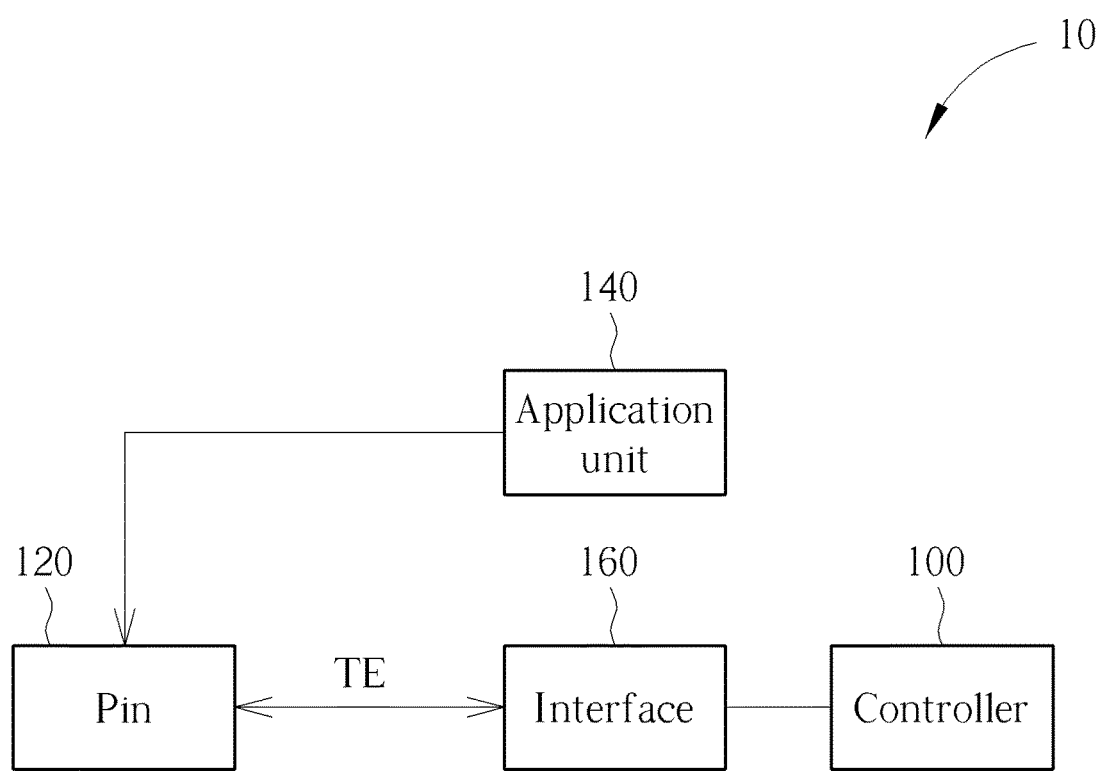
FIG. 1 is a schematic diagram of a computer system according to an embodiment of the present invention.
Figure 2:
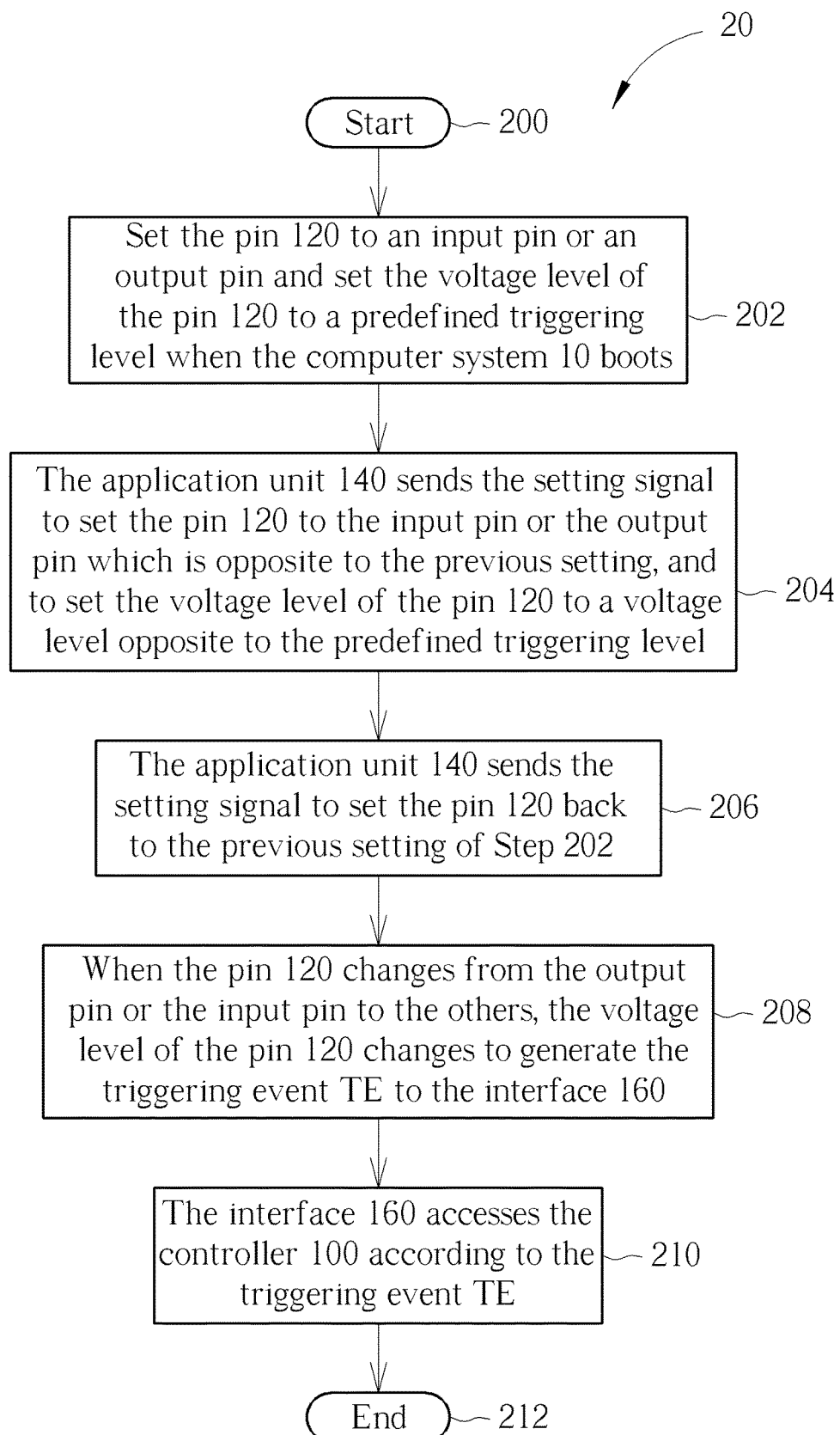
FIG. 2 is a schematic diagram of a process according to an embodiment of the present invention.

Please refer to FIG. 1, which is a schematic diagram of a computer system 10 according to an embodiment of the present invention. The computer system 10 includes a controller 100, a pin 120, an application unit 140 and an interface 160. The controller 100 can be a keyboard controller (KBC) or an embedded controller. The pin 120 can be an input or output pin of a control chip module. For example, the pin 120 can preferably be a general purpose input/output (GPIO) pin of the Southbridge chipset. The application unit 140, which is coupled to the pin 120 and can control a status of the pin 120, is utilized for changing a voltage level of the pin 120. The application unit 140 can be an application installed in the computer system 10. The interface 160, coupled to the pin 120 and the controller 100, is utilized for accessing the controller 100 according to a triggering event TE received from the pin 120. The interface 160 can preferably be an advanced configuration and power interface (APCI), which can process the communication with the operating system and hardware elements through an ACPI source language (ASL). When the application unit 140 sends a setting signal to change the voltage level of the pin 120, the pin 120 may send the triggering event TE to the interface 160. The interface 160 can access the controller 100 directly after receiving the triggering event TE. As a result, the application unit 140 can communicate with the controller 100 proactively by changing the voltage level of the pin 120, and does not need to wait for the controller 100 to notify whether an event occurs. Therefore, even if the computer system 10 does not support the system control interrupt (SCI) and the system management interrupt (SMI), the application unit 140 can still proactively trigger the event to access the controller 100, whether the management techniques of the windows management instrumentation (WMI) are applied or not.

In addition, the method of changing the voltage level of the pin 120 can be performed by setting the pin 120 to an input pin or an output pin to change the voltage level of the pin 120. For example, when the computer system 10 boots, a basic input output system (BIOS) sets the pin 120 to an input pin, and pulls the voltage level of the pin 120 to a high voltage level by using a pull up resistor. Certainly, a pull down resistor may also be applied to pull the pin 120 to a low voltage level. A predefined triggering level can be defined in advance and set to the high voltage level or the low voltage level selectively according to different requirements for practical hardware designs. When the application unit 140 needs to communicate with the controller 100 proactively, the application unit 140 sends a setting signal XX to change the pin 120 to an output pin, and sets the voltage level of the pin 120 to a voltage level opposite to the above predefined triggering level (e.g. sets to a low voltage level). When the application unit 140 sends a setting signal to set the pin 120 back to the input pin, the voltage level of the pin 120 will change accordingly (e.g. from the low voltage level back to the high voltage level), in order to generate the triggering event TE to the interface 160 (e.g. _Lxx event). The interface 160 accesses the controller 100 according to the triggering event TE. As a result, the application unit 140 can access the controller 100 proactively through the change of the voltage level of the pin 120.

The above operations can be summarized into a process 20. The process 20 can be utilized in the computer system 10, for triggering the event proactively to access the controller 100. The process 20 includes the following steps:

Step 200: Start.

Step 202: Set the pin 120 to an input pin or an output pin and set the voltage level of the pin 120 to a predefined triggering level when the computer system 10 boots.

Step 204: The application unit 140 sends the setting signal to set the pin 120 to the input pin or the output pin which is opposite to the previous setting, and to set the voltage level of the pin 120 to a voltage level opposite to the predefined triggering level.

Step 206: The application unit 140 sends the setting signal to set the pin 120 back to the previous setting of Step 202.

Step 208: When the pin 120 changes from the output pin or the input pin to the others, the voltage level of the pin 120 changes to generate the triggering event TE to the interface 160.

Step 210: The interface 160 accesses the controller 100 according to the triggering event TE.

Step 212: End.

According to the process 20, in one embodiment, when the computer system 10 boots, the BIOS sets the pin 120 to the input pin, and pulls the voltage level of the pin 120 to the high voltage level as the predefined triggering level. When the application unit 140 needs to communicate with the controller 100 proactively, the application unit 140 sends the setting signal XX to set the pin 120 to the output pin, and change the voltage level of the pin 120 from the high voltage level to the low voltage level. When the application unit 140 sends the setting signal to set the pin 120 back to the input pin, the pin 120 changes from the low voltage level to the high voltage level, and thus generates the triggering event TE to the interface 160. The interface 160 accesses the controller 100 according to the triggering event TE.

To sum up, when the application unit changes the voltage level of the pin, the pin sends the triggering event to the interface. After receiving the triggering event, the interface can access the controller 100 directly. As a result, the application unit can communicate with the controller proactively, and does not need to wait for the controller 100 to notify whether an event occurs or not. Therefore, even if the computer system does not support the SCI and the SMI, the application unit can trigger the event proactively to access the controller.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of actively event triggering in a computer system, the computer system comprising an application unit, an interface and a basic input output system (BIOS), the method comprising:
    the BIOS setting a pin to an input pin or an output pin and by setting the voltage level of the pin to a predefined triggering level when the computer system boots;
    the application unit sending a setting signal to change a voltage level of the pin of a control chip module;
    the pin generating a triggering event to the interface according to the setting signal from the application unit when the voltage level of the pin changes;
    the interface accessing a controller according to the triggering event to allow the application unit to communicate with the controller actively; and
    wherein the pin is a general purpose input/output (GPIO) pin;
    wherein the interface is coupled between the pin and the controller.

2. The method of claim 1, further comprising
    setting the pin to the input pin or the output pin which is opposite to a previous setting by setting the voltage level of the pin to a voltage level opposite to the predefined triggering level; and
    setting the pin back to the previous setting.

3. The method of claim 1, further comprising:
    setting the pin to an input pin, wherein the input pin operates at a first voltage level;
    changing the pin from the input pin to an output pin;
    setting the voltage level of the output pin to a second voltage level; and
    setting the pin back to the input pin.

4. The method of claim 1, wherein the controller is a keyboard controller (KBC) or an embedded controller.

5. The method of claim 1, wherein the interface is an advanced configuration and power interface (ACPI).

6. The method of claim 1, wherein the application unit is an application installed in the computer system.

7. A computer system, comprising:
    a controller;
    a pin, for generating a triggering event, wherein the pin is an input pin or an output pin of a control chip module;
    a basic input output system (BIOS), for setting the pin to an input pin or an output pin by setting the voltage level of the pin to a predefined triggering level when the computer system boots;
    an application unit, for sending a setting signal to change a voltage level of the pin;
    an interface, for accessing the controller according to the triggering event to allow the application unit to communicate with the controller actively; and
    wherein the pin is a general purpose input/output (GPIO) pin;
    wherein the interface is coupled between the pin and the controller.

8. The computer system of claim 7, wherein the application unit sends the setting signal to set the pin to the input pin or the output pin which is opposite to a previous setting and to set the voltage level of the pin to a voltage level opposite to the predefined triggering level, and then to set the pin back to the previous setting in order to generate the triggering event.

9. The computer system of claim 7, wherein the computer system further comprises a basic input output system (BIOS), for setting the pin to an input pin, wherein the input pin operates at a first voltage level when the computer system boots.

10. The computer system of claim 9, wherein the application unit changes the pin from the input pin to an output pin, sets the voltage level of the output pin to a second voltage level, and sets the pin back to the input pin.

11. The computer system of claim 10, wherein the triggering event is generated when the pin is set back to the input pin.

12. The computer system of claim 7, wherein the controller is a keyboard controller (KBC) or an embedded controller.

13. The computer system of claim 7, wherein the interface is an advanced configuration and power interface (ACPI).

14. The computer system of claim 7, wherein the application unit is an application installed in the computer system.

* * * * *